Oct. 16, 1951     A. W. MASSECAR     2,571,373
GRIDDLECAKE MACHINE

Filed Oct. 21, 1946     6 Sheets-Sheet 1

INVENTOR.
Aubrey W. Massecar,
BY
Attorney.

Oct. 16, 1951    A. W. MASSECAR    2,571,373
GRIDDLECAKE MACHINE
Filed Oct. 21, 1946    6 Sheets-Sheet 2
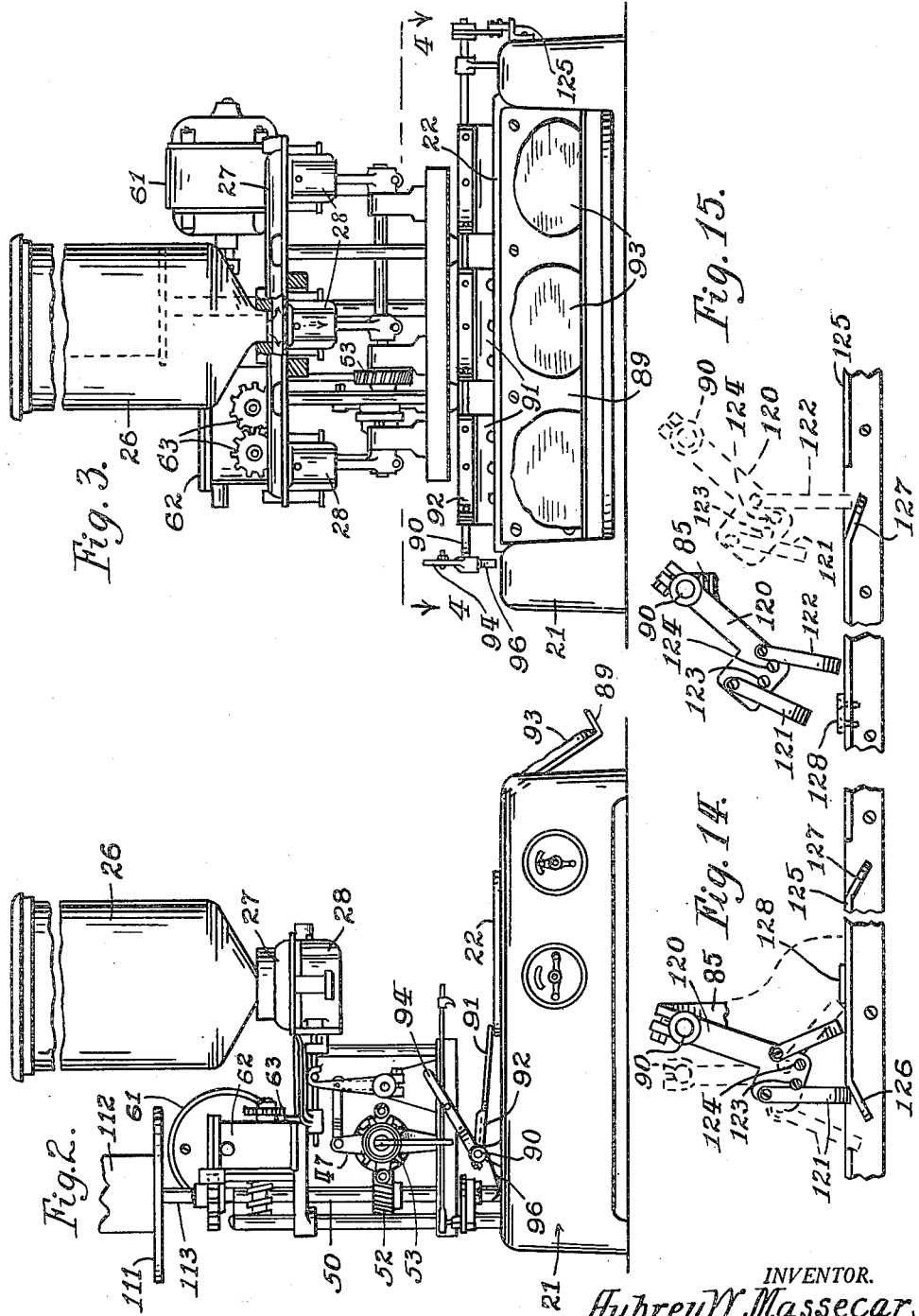
INVENTOR.
Aubrey W. Massecar,
BY
Attorney INVENTOR.
Aubrey W. Massecar,
BY
Attorney.

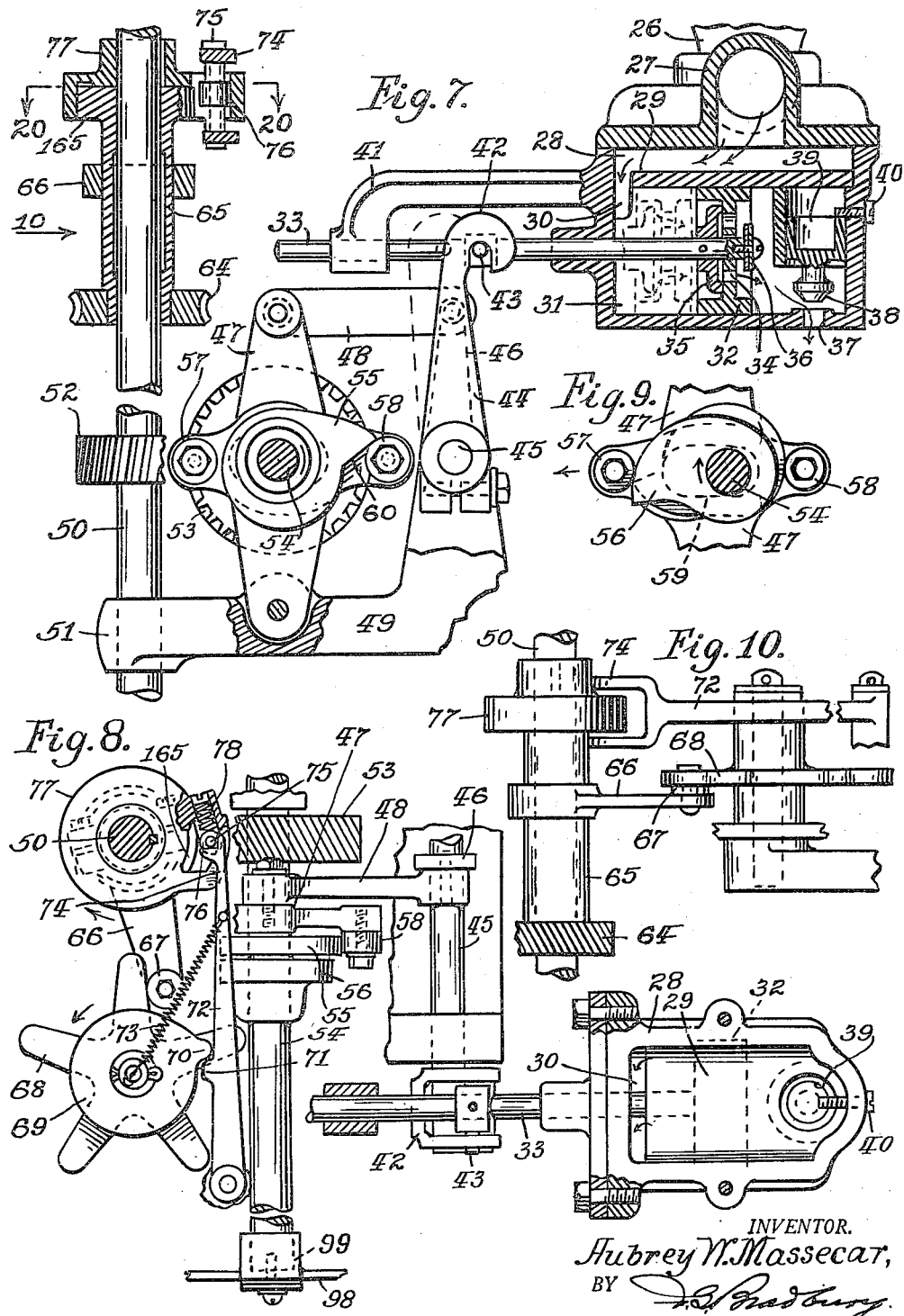

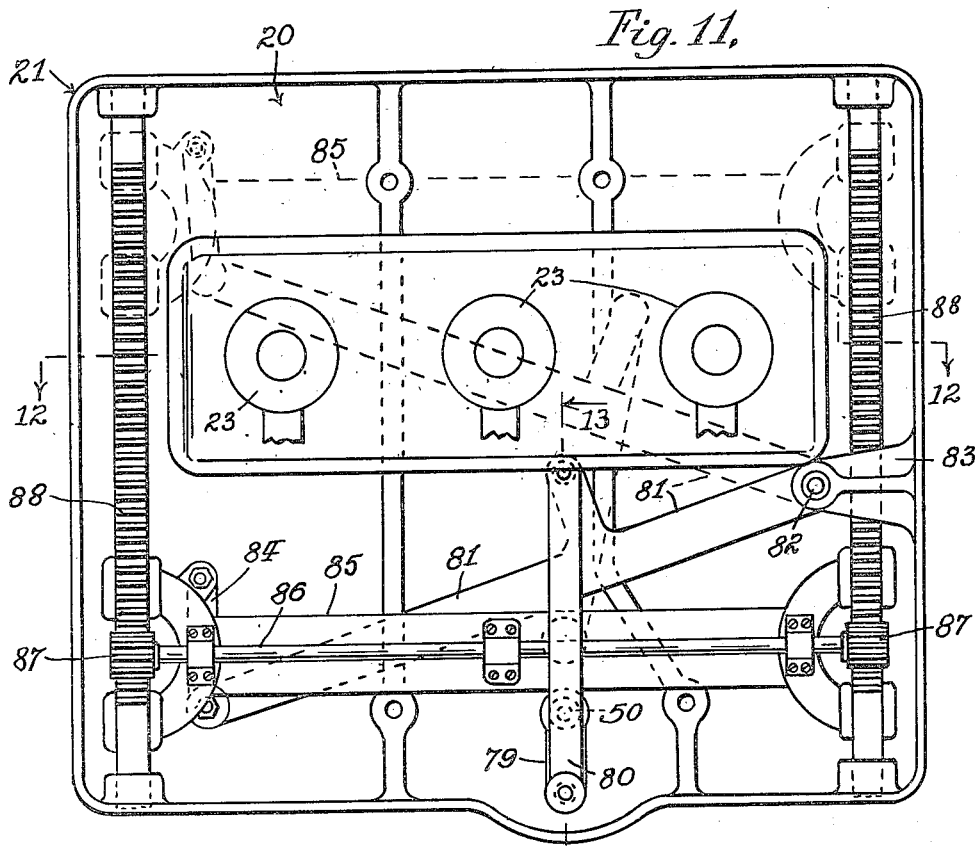

Oct. 16, 1951 A. W. MASSECAR 2,571,373
GRIDDLECAKE MACHINE
Filed Oct. 21, 1946 6 Sheets-Sheet 6
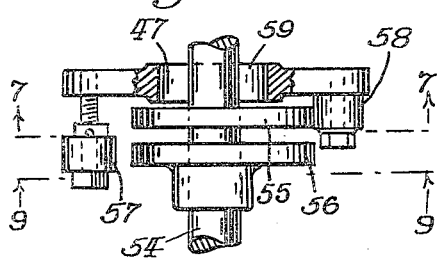
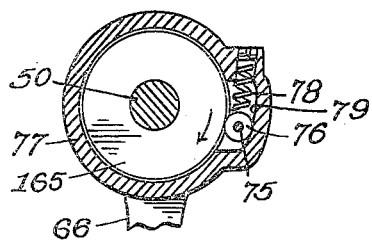
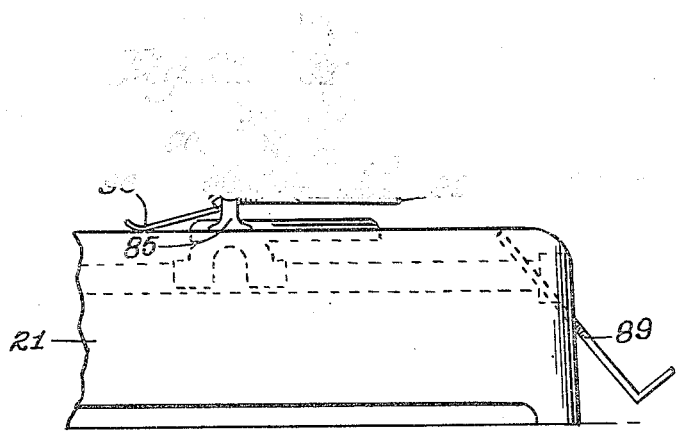
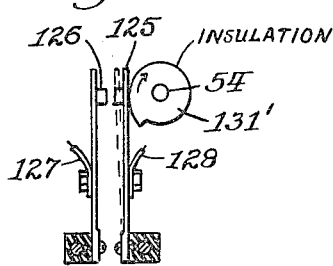
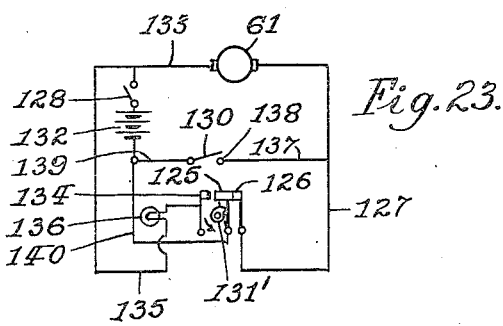
INVENTOR.
Aubrey W. Massecar,
BY
Attorney.

Patented Oct. 16, 1951

2,571,373

UNITED STATES PATENT OFFICE 2,571,373

GRIDDLECAKE MACHINE

Aubrey W. Massecar, Huntington Park, Calif., assignor, by mesne assignments, to C. E. Doolin Application October 21, 1946, Serial No. 704,788

14 Claims. (Cl. 99—423)

My invention relates to a griddlecake machine, and it has for an object to provide mechanical means for automatically turning over a cake on a stationary griddle, and discharging the cake from the griddle after it has baked on both sides.

Another object is to provide means to automatically control the amount of batter placed on the griddle, in order to control the size of the griddlecakes baked by the machine.

Among still further objects is to provide a machine which is adapted automatically to bake pancakes (griddlecakes etc.) and to process other material using heat, refrigeration, cooling or air conditioning in the process of manufacturing when the material being processed is to be turned over and or removed to further the processing cycle, and further to be of aid when substantially the correct or exact amount of material is required in the process of manufacturing.

The invention also comprises novel details of construction and novel combinations and arrangements of parts, which will more fully appear in the course of the following description.

In the drawings, like reference characters designate similar parts in the several views.

Figure 2 is a side elevation of said embodiment.

Figure 3 is a front elevation of said embodiment.

Figure 7 is an enlarged, broken sectional view of a batter feeding element and associated parts, taken on the line 7—7 of Figure 19.

Figure 8 is a top view of the element shown in Figure 7.

Figure 9 is another position of a cam shown in elevation in Figure 7. Figure 9 is taken on the line 9—9 of Figure 9.

Figure 10 is a broken elevation looking in the direction of the arrow 10 of Figure 7.

Figure 11 is a bottom view of the embodiment.

Figure 12 is a section taken on the line 12—12 of Figure 11.

Figure 13 is a section taken on the line 13—13 of Figure 11.

Figures 14 and 15 are fragmentary elevations of operating mechanism, showing different positions in the operation of the device.

Figure 19 is a broken plan view of a portion of Figure 8.

Figure 20 is a broken, sectional view of an element in Figure 8.

Figure 21 shows the final position in the single cycle of operation of the machine.

Figure 22 is a sectional elevation taken on the line 22—22 of Figure 4.

Figure 23 is a diagrammatic view of a circuit comprised in the invention.

Figure 1:
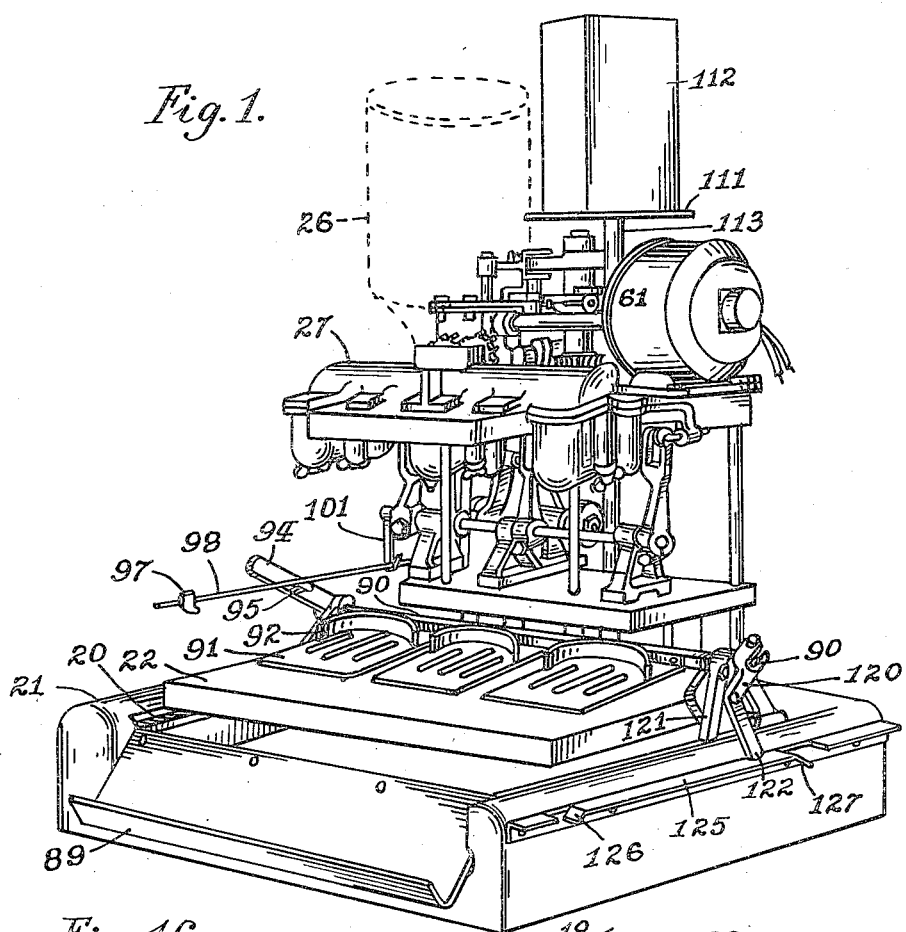
Figure 1 is a perspective view of an embodiment of my invention.
Figure 16:
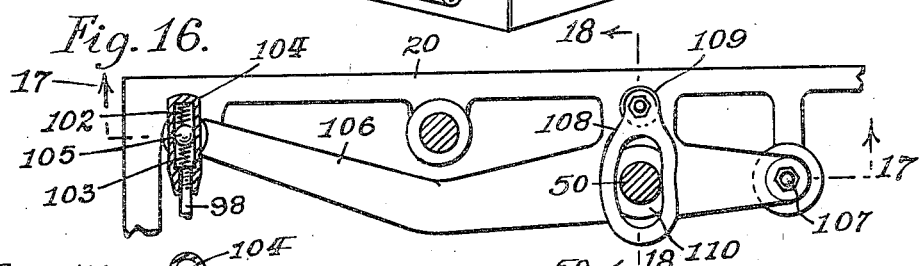
Figure 16 is a broken section of a detail comprised in the embodiment.
Figure 17:
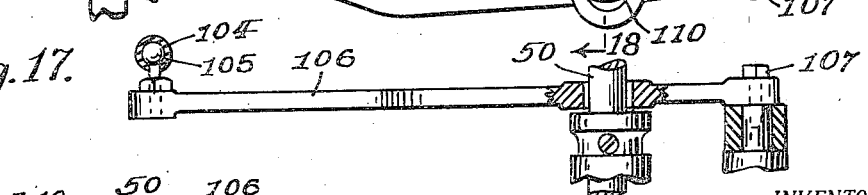
Figure 17 is a section taken on the line 17—17 of Figure 16.
Figure 18:
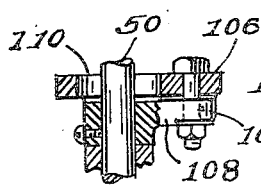
Figure 18 is a section taken on the line 18—18 of Figure 16.
Figure 4:
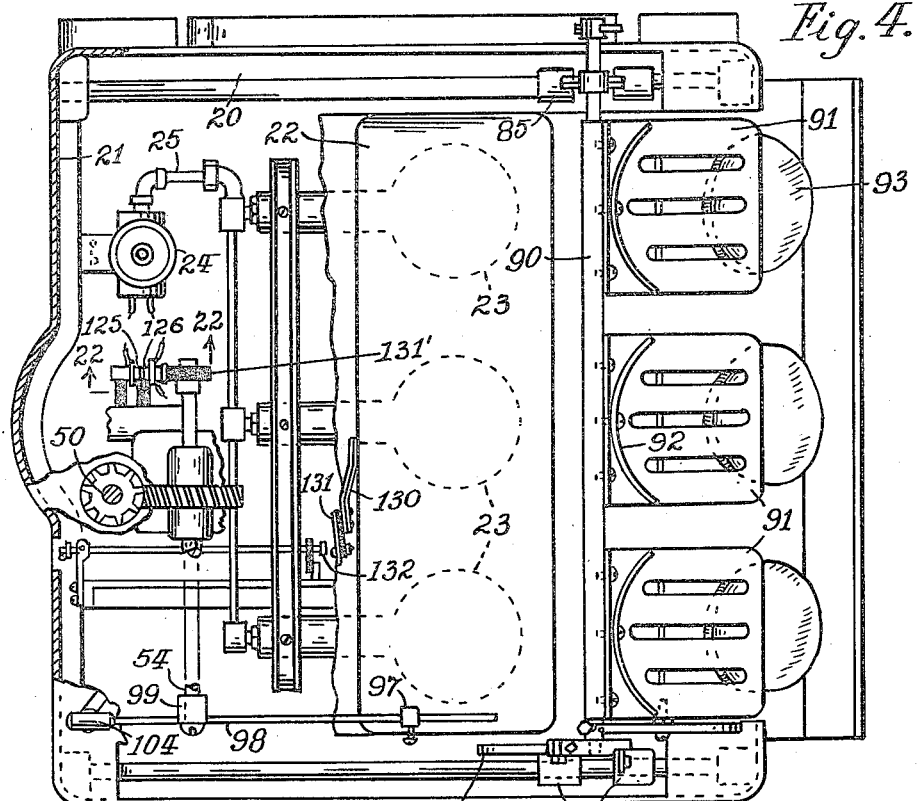
Figure 4 is a broken, sectional view taken on the line 4—4 of Figure 3.

Referring more in detail to the drawings, the reference numeral 20 generally designates a frame for the present machine, enclosed within a housing 21. A griddle 22 is arranged on the frame for the baking of griddlecakes. Gas burners 23 are disposed beneath the griddle to heat same. A magnetic valve 24 controls the flow of gas to the burners through conduit 25.

A reservoir 26 for batter is arranged to supply batter into a manifold 27, which in turn empties into a plurality of feed chambers 28 (three are shown in the embodiment shown in the drawings, but of course different numbers may be used).

A partition 29 provides a floor for each chamber 28. A passage 30 at an end of the partition connects the chamber 28 with a cylindrical chamber 31, in which reciprocates a piston 32. A piston rod 33 has a sliding fit with the piston 32. The piston 32 has passages 34 therethrough, which are closed by a valve 35 that is pinned to the piston rod 33. Washers 36 bolted on the end of the rod 33 are spaced from the valve 35 a greater distance than the thickness of the intervening thickness of the piston 32, to permit play of the rod 33 relative to the piston.

When the rod 33 is moved to the left, in Figure 7, the valve is moved away from the passages 34, thus permitting batter to move from the left side of the piston to the right side thereof. Then when the piston is moved to the right, by means of the rod in Figure 7, the valve closes the passages through the piston and the batter in the cylinder 31 is driven therefrom, through a discharge outlet 37 on to the griddle directly below same.

A sliding valve 38 by gravity normally closes the outlet 37. The valve 38 has a pocket 39 above the nose 38 of the valve, which pocket connects with the chamber 28. The horizontal area of the pocket 39 is greater than the similar area of the nose 38, so that batter in the pocket 39 tends to cause the valve 38 to close. A stop 40 limits upward movement of the valve 38 and the weight of the valve and pressure of fluid compensates the movement of the valve to regulate the amount and preferred pressure of batter admitted into the cylinder during each complete operation.

A bracket 41 on the cylinder housing provides a bearing for the piston rod. A yoke 42 hooks over a pin 43 on the piston rod 33. The yoke is mounted on an arm 44 that is clamped to a rocking shaft 45. A second arm 46 on the shaft 45 is connected with a rocking carrier 47 by means of a link 48. The carrier 47 rocks on an arm 49 of the frame of the machine. The latter arm also provides a bearing 51 for the main shaft 50 of the device.

A worm gear 52 on the shaft 50 meshes with a worm gear 53 on a counter-shaft 54 that rotates cams 55 and 56, which are mounted upon the shaft 54. The carrier 47 has spaced rollers 57 and 58 rotatably mounted thereon and has an oblong slot 59 therein, to permit rocking motion of the carrier 47 relative to the shaft 54. The roller 57 is disposed opposite the cam 56, as shown in Figure 19. Rotation of the shaft 54 in the direction of the arrow adjacent same in Figure 7 causes the cam 55 to engage the roller 58 and by reason of the steep face 60 on the cam 55, the carrier 47 is rocked to the right, in Figure 7, at a rapid rate, thus causing comparatively rapid expulsion of the batter through the discharge passage 37. This comparatively rapid rate of discharge causes the batter to be expelled upon the griddle in time to avoid being intercepted by griddle cake removers, hereinafter more fully described.

Continued rotation of the shaft 54 causes the cam 56 to engage the roller 57, as shown in Figure 9. This engagement effects movement of the carrier 47 to the left in Figure 7. The movement of the piston 32 to the left in Figure 7 is effected slowly by means of the gradual incline of the cam 56. This relatively slow movement permits batter to pass through the openings 34 in the piston. The piston 32 and the arm 44 are thereby moved to the broken line positions shown in Figure 7.

A motor 61 is connected to drive the main shaft 50 through the intermediary of gear reduction enclosed in a box 62. Details of the gear reduction are not deemed necessary for one skilled in the art. Gears 63 are shown in the gear train for changing the speed of the shaft 50 relative to the rotation of the motor, in order to compensate for different cycles of electric current. Through the means just described a worm gear 64 is driven by the motor. The worm gear 64 is mounted on a sleeve 65 which is loose on the shaft 50. A crank arm 66 is also mounted on the sleeve 65. A roller 67 on the arm 66 drives a Geneva 68. A cam 69 is connected to be driven by the Geneva in the direction of the arrow adjacent the periphery of the cam. A shoulder 70 on the cam engages a boss 71 on an arm 72. A spring 73 tends to hold a yoke 74 in engagement with a pin 75 on a roller clutch 76.

A collar 77, fastened on the shaft 50, rotates around a head 165 on the sleeve 65. A coil spring 78 tends to wedge the roller clutch 76 between an inclined face 79 on the sleeve and the periphery of the head 165. When so wedged the clutch causes the collar 77 and the shaft 50 to rotate with the sleeve 65. The yoke 74, in the position shown in Figure 8, engages the pin 75 and holds the clutch 76 out of said locking position, against the action of the spring 78.

The Geneva permits the shaft 50 to rotate four times before the shoulder 70 of the cam 69 engages the boss 71 and moves the yoke 74 out of its restraining position with regard to the clutch 76. When the yoke 74 is so moved, the clutch locks the collar 77 and the sleeve 65 for conjunctive rotation, in the manner stated.

The lower end of the main shaft 50 carries a crank 79, which in turn is pivotally joined by a connecting rod 80 to a cross bar 81. The bar 81 has a fixed pivot 82 on a bracket 83 of the housing 21. Another link 84 connects the cross bar 81 with a carriage 85. An axle 86 on the under side of the carriage 85 carries pinions 87 which mesh with racks 88 exposed on the under side of the machine. The two extreme positions of the carriage 85 are shown in Figure 11, one of the positions being shown in broken lines, the other in full lines.

The carriage 85, by the linkage just described, is moved backward and forward with respect to the griddle 22 and with respect to an inclined receiver 89 for griddlecakes 93. A shaft 90 on the carriage extends transversely of the machine and moves in a path above the griddle. A series of griddlecake turning blades or peels 91 are mounted on the shaft 90. Guards 92 at the rear of the turning blades 91 restrict movement of griddlecakes upon the turners. A lever 94 on the shaft 90 carries a lug 95. A flat spring 96 tends to hold the lever 94 and the turning blades 91 in the full line position shown in Figure 5.

Figure 5:
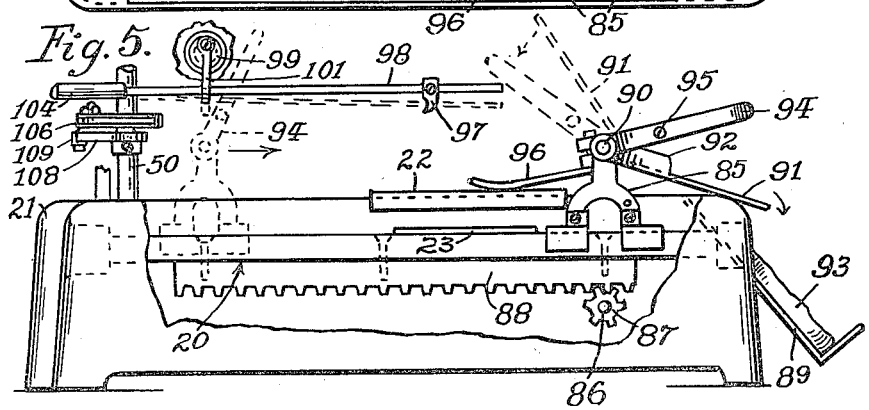
Figure 5 is a broken, side elevation of the lower part of the embodiment.
Figure 6:
Figure 6 is a fragmentary, sectional view of a detail more fully described hereinafter.

A hook 97 on a rod 98 in one of its positions (shown in broken lines in Figure 5) is in the path of the lug 95, whereby the hook 97 engages the lug 95 and by means of the lever 94 turns the turning blades 91 to the broken line position in Figure 5.

The element which controls the position of the rod 98 is an eccentric 99 driven by the shaft 54. A depending finger 101 hooks around the rod 98 and supports the rod from the eccentric 99. The eccentric is arranged to lift the hook member 97 out of the path of the lug 95 when the blades 91 have scraped a pancake from the griddle 22 after the cake has been baked on both sides. This moving of the hook 97 out of the path 95 permits the turning blades 91 to discharge griddlecakes thereon.

Moving the turning blades 91 to the broken line position in Figure 5 turns the griddlecakes over after they have been baked on one side. In order to provide a rapid turning movement springs 102 and 103 are provided in a hollow head 104 on the rod 98. These springs are disposed on either side of a knob 105 at an end of a lever 106 pivoted on the frame at 107. The main drive shaft 50 carries a cam 108 that engages a roller 109 on the lever 106. The lever has an oblong recess 110 to permit pivotal movement of the lever 106 relative to the shaft 50.

By the means just described the cam 108 provides a sudden flipping motion to the turning blades 91 in order to rapidly turn over the griddlecakes.

At the opposite end of the shaft 90 from the lever 94 is another lever 120, from which loosely depend legs 121 and 122. Stops 123 and 124 limit movement of the legs toward each other. The legs are arranged to travel along a track 125 at a side of the machine. There are a drop-off 126 and an incline 127 in the track. The leg 121 is arranged to drop-off at the break 126 in the track during forward movement of the carriage (to the left in Figures 14 and 15), and the leg 122 is arranged to travel down the incline 127 during rearward movement of the carriage (to the right in Figures 14 and 15).

As the carriage begins its rearward movement (to the right in Figures 14 and 15), the leg 122 strikes an abutment 128, so that the lever 120 and the leg 122 assume the positions shown in full lines in Figure 15 after the leg 122 passes the abutment 128.

When the lever 120 is in this latter position, the turning blades 91 are lifted above the griddle, to avoid scraping batter therefrom. By the time the lever 120 has reached its rearmost position, the leg 122 has traveled down the incline 127, thus dropping the blades 91 down to a position in which their forward edges are substantially flush with the upper surface of the griddle.

The function of the leg 121 and the drop-off 126 are to permit a final, sudden dropping of the forward end of the turning blades at the forward edge of the machine, to effectively discharge the cakes from the blades.

During forward movement of the carriage (to the left in Figures 14 and 15), the leg 122 drags along the track (as shown in full lines in Figure 14), and performs no function. During rearward movement of the carriage (to the right in Figures 14 and 15), the leg 121 is lifted from the track and is inoperative (see same in full lines in Figure 15).

A rotary platform 111 is arranged to rotate a package 112, which may contain pancake flour of the variety used in the griddlecakes. A shaft 113 over the platform is intermittently rotated by the crank arm 66, which operates the Geneva. A star wheel 115 is arranged to be intermittently rotated by the crank arm 66.

A thermostat comprises bi-metallic, heat sensitive members 130 which actuate a contact 131 to engage a contact 132. These contacts are in the circuit of the magnetic valve 24, so that the supply of gas will automatically shut off or be reduced when the griddle reaches a pre-determined temperature and will automatically turn on or turn up the supply of gas when the temperature of the griddle falls to a predetermined point. Thus the griddle is maintained at a substantially uniform temperature. It is to be understood without further description and illustration that a pilot light supply tube may short circuit the valve 24, in order that the light therefrom may ignite gas supplied to the burners 23 when same are turned on.

Incorporated in the machine is mechanism for automatically stopping the blades 91 directly above the griddle at the end of the second cycle of operation, in order to keep griddlecakes 93 thereon in a warmed condition. This position of the blades is shown in Figure 21.

At the time that the blades stop in this position, a signal automatically indicates to the operator that the cakes are baked and are waiting to be removed.

This single-cycle operation, which stops in a position to keep the cakes warm, is for the purpose of baking a single batch of cakes, such as in slack hours or when there is only one order for cakes.

To produce this result, contacts 125 and 126 are arranged in the circuit of the motor 61, as best shown in Figure 23. A wire 127 connects contact 126 with one pole of the motor 61. The contacts 125, 126 are spring contacts that are normally separate. A cam 131' moves the contacts into engagement with each other and allows the contacts to spring apart, as shown in Figure 22, when a narrower diameter of the cam engages the contact 125.

A source of electrical energy 132 is connected with the opposite pole of the motor 61 by a wire 133. A third contact 134 is connected with the source by a wire 135. An electric light 136 is arranged in the wire 135. A wire 137 connects a pole 138 with the motor through the wire 127. A manual switch 130 is connected by a wire 139 with a wire 140 that connects the source with the contact 125. The switch member 130 is arranged to engage the pole 138 in a closed position.

It will be noted that the switch 130 and the contacts 125, 126 are in parallel in the motor circuit, so that either may close the motor circuit. When the switch 130 is closed, the motor 61 runs continually and batches of griddlecakes are continually baked. When the switch 130 is open, the motor runs until the contacts 125, 126 separate. The cam 131 is timed for its narrower diameter to engage the contact 125 at the time the blades 91 are directly above the griddle, bearing cakes baked on both sides. At this point the contact 125 is allowed to spring away from the contact 126, thereupon breaking the motor circuit and stopping the motor.

As the contact 125 springs away, it engages the contact 134, thus closing the circuit of the light 136. The illumination of the light 136 indicates to the operator that a batch of cakes is ready to be served and is being kept warm until removed. It is believed clear without further illustration that a bell or other audible or visual signal may be substituted for the light 136.

A master switch 128 shuts off both the light and the motor. This switch is closed during any operation of the machine.

In the operation of the machine, batter is introduced into the reservoir 26 and the motor 61 is turned on. The magnetic valve 24 automatically maintains the griddle 22 substantially at the desired temperature.

Batter supplied by the reservoir flows into the cylinder 31 and passes through the piston 32 on the return stroke of the piston. Upon the forward stroke of the piston the batter is expelled through the discharge opening 37. During the return stroke this opening is closed by the valve 38. The operating mechanism of the piston has been heretofore described in detail.

At a pre-determined time in the operation of the machine, the blades 91 move from the position shown in Figure 2 toward the forward edge of the machine. The blades 91 thereby scrape the griddlecakes from the griddle. This operation has been timed to permit one side of the batter to be baked. When the blades 91 reach the forward end of the machine they are turned over by means of the lever 94. A sudden flipping motion is imparted to the blades by means of the cam 108 and associated parts. The griddlecake is thereby turned over upon the griddle so as to bake its other side.

Upon the return movement of the carriage 85 to the rear edge of the griddle, the blades 91 are raised above the griddlecakes by means of the leg 121.

Upon the next forward stroke of the carriage 85, the blades 91 again remove the griddlecakes from the griddle but this time carry the cakes forward to a position above the receiver 89. At this point the leg 121 slips down the drop-off 126, thus giving a sudden dropping motion to the blades 91, to shake the cakes therefrom. The carriage 85 then returns to its rearward position and is again ready for the next cycle of operation of the machine.

When it is desired to keep the cakes warm after they are baked and stop the machine at that point, the manual switch 130 is opened. The means for automatically stopping the blades above the hot griddle, with baked cakes on the blades, has been explained.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a machine for baking griddlecakes, the combination of a griddle, mechanism to intermittently discharge batter on to the griddle, a peel, means to move the peel across the griddle to remove a cake therefrom when the cake has baked on one side, means to turn the peel to invert the cake on the griddle, the first-mentioned means moving the peel to finally remove the cake from the griddle when the cake has baked on the other side, and moving the peel past the point of discharge of batter on to the griddle, the batter discharging mechanism being connected to discharge batter on to the griddle while the peel is past the griddle, and means to lift the peel above the batter on the return movement of the peel.

2. In a machine for baking griddlecakes, the combination of a griddle, mechanism to intermittently discharge batter on to the griddle, a peel, means to move the peel across the griddle to remove a cake therefrom when the cake has baked on one side, means to turn the peel to invert the cake on the griddle, the first-mentioned means moving the peel to finally remove the cake from the griddle when the cake has baked on the other side, and moving the peel past the point of discharge of batter on to the griddle, the batter discharging mechanism being connected to discharge batter on to the griddle while the peel is past the griddle, a track, and lever means having an element inoperative on the cake-removing movements of the peel, but said element being arranged to engage the track and lift the peel above the batter on the return movement of the peel after the discharge of the batter.

3. In a machine for baking griddlecakes, the combination of a griddle, mechanism to intermittently discharge batter on to the griddle, a peel, means to move the peel across the griddle to remove a cake therefrom when the cake has baked on one side, a lever connected to turn the peel to invert the cake on the griddle, when the lever is operated, a hook means arranged to effect said movement of the lever, the first-mentioned means moving the peel to finally remove the cake from the griddle when the cake has baked on the other side, the hook means being rendered inoperative during the final removal of the cake from the griddle, to permit discharge of the baked cake.

4. In a machine for baking griddlecakes, the combination of a griddle, a carriage movable backward and forward with respect to the griddle, a pivoted arm having a relatively fixed pivot and having a swinging portion connected with the carriage, crank mechanism connected to swing the pivoted arm, a peel on the carriage, mechanism to turn the peel on the first cycle of movement across the griddle and to discharge a cake from the griddle on the second cycle of movement across the griddle, said mechanism for turning the peel having a hand operated control by which the peel is elevated and detained in elevated position above the griddle during the second cycle of movement and driving means for the crank mechanism.

5. In a machine for baking griddlecakes, the combination of a griddle, a peel, means to move the peel across the griddle to remove a cake therefrom when the cake has baked on one side, mechanism to turn the peel to invert the cake on the griddle, said means to move the peel serving to remove the cake from the griddle when the cake has baked on the other side, and mechanism arranged to automatically stop the peel above the griddle in spaced relation to the griddle, to receive warmth from the griddle.

6. In a machine for baking griddlecakes, the combination of a griddle, a peel, means to move the peel across the griddle to remove a cake therefrom when the cake has baked on one side, mechanism to turn the peel to invert the cake on the griddle, said means to move the peel also serving to remove the cake from the griddle when the cake has baked on the other side, a signal, and mechanism arranged to automatically stop the peel above the griddle in spaced relation to the griddle and to actuate the signal.

7. In a machine for baking griddlecakes, the combination of a griddle, a peel, an electric motor, a circuit for the motor, means operable by the motor to move the peel across the griddle to remove a cake therefrom when the cake has baked on one side, mechanism operable by the motor to turn the peel to invert the cake on the griddle, said means to move the peel also operable by the motor to move the peel to remove the cake from the griddle when the cake has baked on the other side, means for stopping the movement of the peel in a position above the griddle, and a circuit breaker connected to automatically break the circuit of the motor when the peel is in a position above the griddle.

8. In a machine for baking a plurality of griddlecakes simultaneously, the combination of a griddle, mechanism to intermittently discharge batter onto said griddle to deposit a plurality of cakes thereon simultaneously, a plurality of peels corresponding with said cakes, means for simultaneously moving said peels across the griddle to remove all of the cakes therefrom when the cakes are baked on one side, means to reverse the peels to turn the cakes on the griddle, the first mentioned means moving the peels to finally remove the cakes from the griddle when the cakes have baked on the other side, and moving the peels past the point of discharge of the batter on the griddle, the batter discharging mechanism being connected to discharge batter on to the griddle while the peels are past the griddle, and means to lift the peels above the batter on the return movement of the peels.

9. In a machine for baking a plurality of griddlecakes simultaneously, the combination of a griddle, mechanism to intermittently discharge batter on to the griddle to produce a plurality of cakes thereon, a group of peels corresponding with the cakes on the griddle, means to move said group of peels across the griddle to remove the cakes therefrom when the cakes have baked on one side, means to reverse the peels to turn the cakes on the griddle, the first mentioned means moving the group of peels to finally remove the cakes from the griddle when the cakes have baked on the other side, and moving the peels past the point of discharge of batter on to the griddle, the batter discharging mechanism being connected to discharge batter on to the griddle while the peels are past the griddle, a track, and lever means having an element inoperative on the cake-removing movements of the peels, but said element being arranged to engage the track and lift the peels above the batter on the return moveemnt of the peels after the discharge of batter on to the griddle.

10. In a machine for baking griddlecakes, the combination of a griddle, mechanism to intermittently discharge batter on to the griddle to form a plurality of cakes thereon, a group of peels, means to move said group of peels across the griddle to remove the cakes therefrom when the cakes have baked on one side, a lever connected to invert the peels to turn the cakes on the griddle when said lever is operated, a hook means arranged to effect said movement of the lever, the first mentioned means moving the group of peels to finally remove the cakes from the griddle when the chakes have baked on the other side, the hook means being rendered inoperative during the final removal of the cakes from the griddle to permit the discharge of the cakes.

11. In a machine for baking griddlecakes, the combination of a griddle, a carriage movable backward and forward with respect to the griddle, a pivoted arm having a relatively fixed pivot and having a swinging portion connected with said carriage, crank mechanism connected to swing the pivoted arm, a group of peels on said carriage, mechanism to turn the peels of said group on the first cycle of movement across the griddle and to discharge the cakes from the griddle on the second cycle of movement across the griddle, said mechanism for turning the peels having a hand operated control by which the peels are elevated and detained in elevated position above the griddle during the second cycle of movement, and driving means for the crank mechanism.

12. In a machine for baking griddle cakes, the combination of a griddle, a group of peels, means to move the group of peels across the griddle to remove a group of cakes therefrom when the cakes are baked on one side, means to turn the peels to invert the cakes on the griddle, said means to move the peels also serving to remove the cakes from the griddle when the cakes are baked on the other side, and means arranged to automatically stop the peels above the griddle in spaced relation to the griddle, to receive warmth from the griddle.

13. In a machine for baking griddlecakes, the combination of a griddle, a group of peels, means to move the group of peels across the griddle to remove cakes therefrom when the cakes have baked on one side, means for turning the group of cakes on the griddle, said means to move the peels also serving to remove the cakes from the griddle when the cakes have baked on the other side, a signal, and means arranged to automatically stop the group of peels above the griddle in spaced relation to the griddle and to simultaneously actuate said signal.

14. In a machine for baking griddlecakes, the combination of a griddle, a group of peels, an electric motor, a circuit for the motor, means operable by the motor to reciprocate the group of peels across the griddle to remove the group of cakes therefrom when the cakes have baked on one side, means operable by the motor to invert the peels to turn the cakes on the griddle, said means to invert the peels also operable by the motor to actuate the group of peels and remove the cakes from the griddle when the cakes have baked on the other side, means for stopping the movement of the peels in a position above the griddle, and a circuit breaker connected to automatically break the circuit of the motor when the group of peels is in a position above the griddle.

AUBREY W. MASSECAR.

REFERENCES CITED

The following references are of record in the file of this patent:

UNITED STATES PATENTS

| Number | Name | Date |
| --- | --- | --- |
| Re. 19,685 | Brand | Sept. 3, 1935 |
| 1,809,004 | Vierling et al. | June 9, 1931 |
| 1,848,104 | Brand | Mar. 8, 1932 |
| 1,881,126 | Parr | Oct. 4, 1932 |
| 2,033,178 | Brand et al. | Mar. 10, 1936 |